FIGURE III
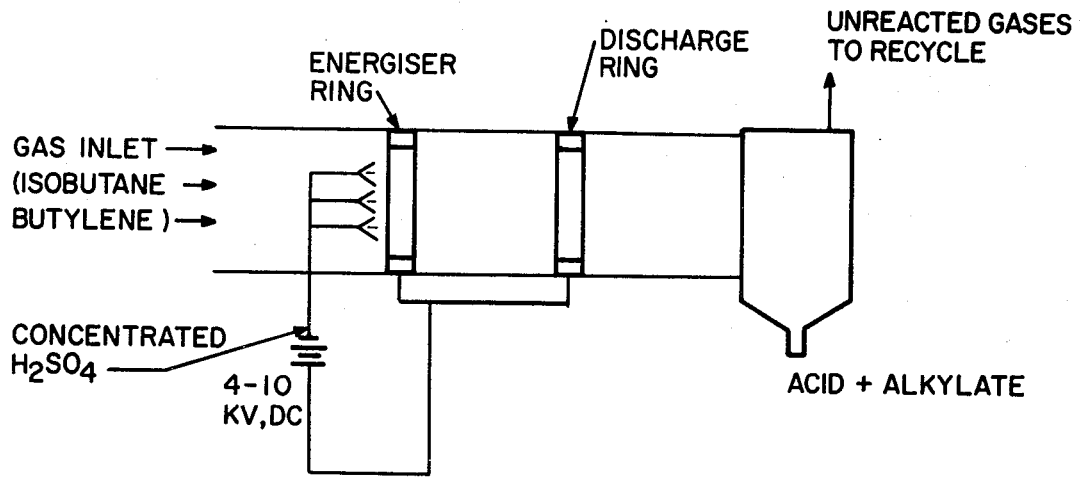
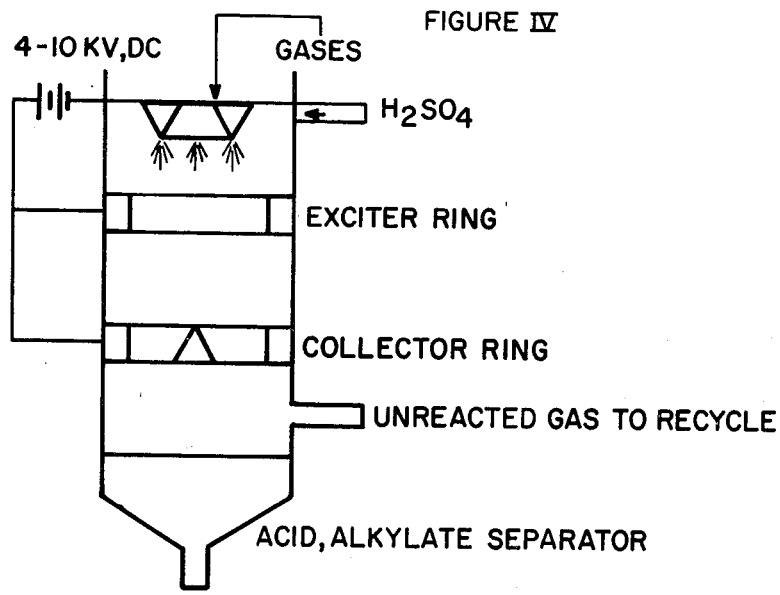

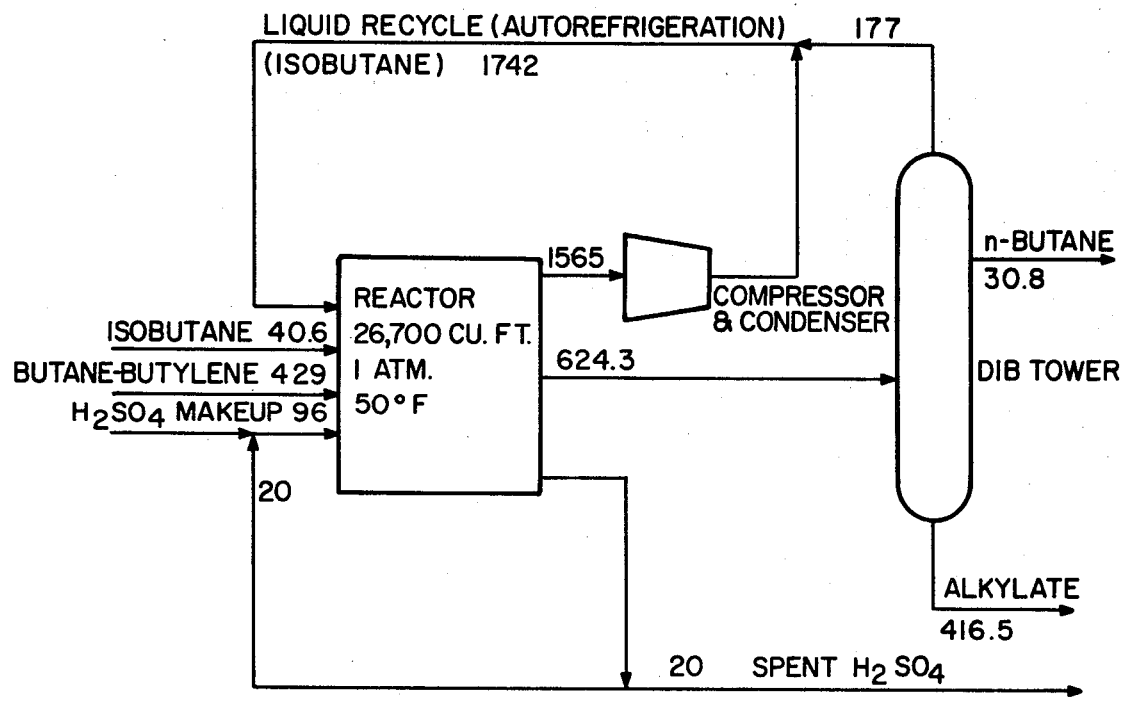
FIGURE I
GAS-PHASE COCURRENT ALKYLATION
ALL FLOWRATES EQUIVALENT LIQUID BBL/HR.

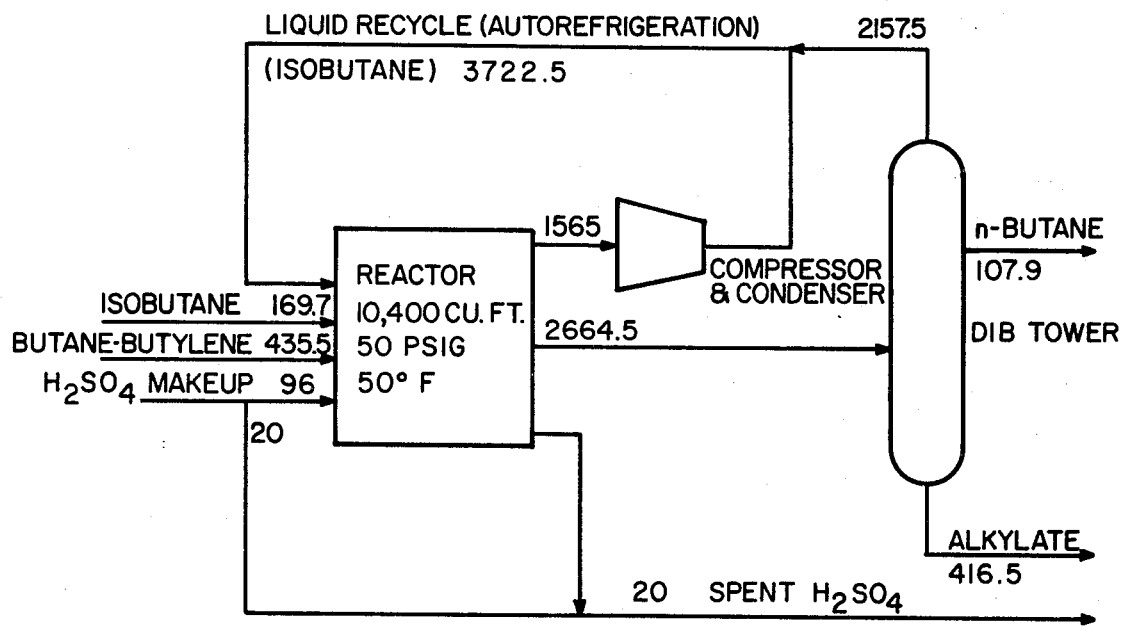
FIGURE II
PRIOR ART ALKYLATION
ALL FLOWRATES EQUIVALENT LIQUID BBL/HR.

Feb. 20, 1973
J. W. MILLER
3,717,686
GAS-FOG ALKYLATION PROCESS
Filed June 7, 1971
4 Sheets-Sheet 4
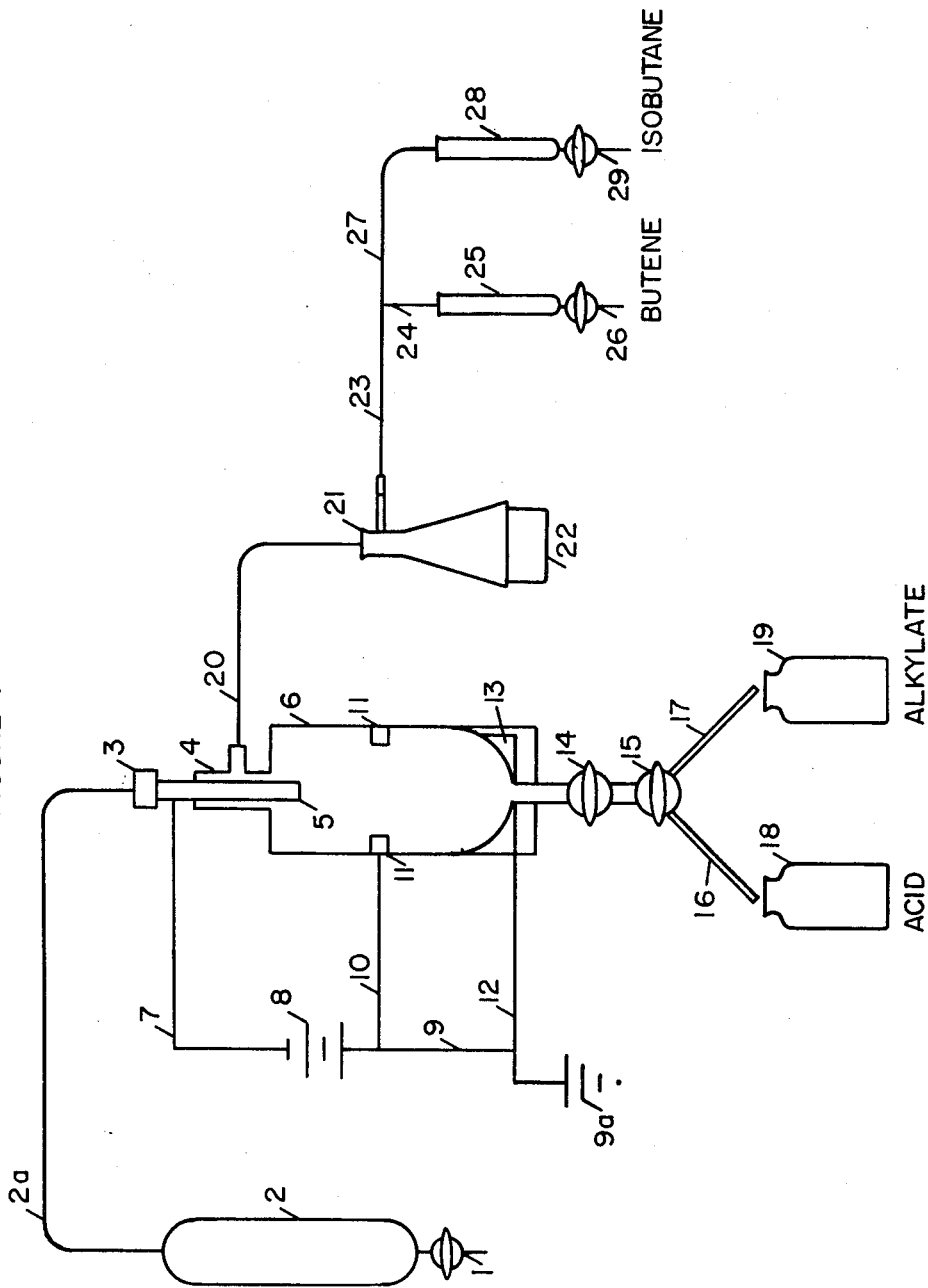
FIGURE V
INVENTOR
JAYDEE W. MILLER
BY *Barry A. Brown*
ATTORNEY

United States Patent Office 3,717,686
Patented Feb. 20, 1973

3,717,686
GAS-FOG ALKYLATION PROCESS
Jaydee W. Miller, Wallingford, Pa. (% Sun Oil Company,
P.O. Box 426, Marcus Hook, Pa. 19061)
Filed June 7, 1971, Ser. No. 150,607
Int. Cl. C07c 3/54
U.S. Cl. 260—683.59     11 Claims

ABSTRACT OF THE DISCLOSURE

A process for alkylation of gaseous $C_2$–$C_5$ monoolefin with gaseous $C_4$–$C_6$ branched paraffin comprises contacting the mixed gases at alkylation conditions with a fog or mist of strong mineral acid. Preferably, the catalyst and hydrocarbon reactants are maintained in a concurrent flow. For $C_3$ or $C_4$ acyclic monoolefin and $C_4$ or $C_5$ isoparaffin, the preferred alkylation conditions include a temperature in the range of about 30–80° F. and a pressure about atmospheric (e.g., 5–25 p.s.i.a., typically 14–20 p.s.i.a.). The feed mole ratio, paraffin to olefin, can be in the range of 1:1 to 60:1, typically 2:1 to 30:1. Liquid paraffin (e.g., isobutane) can be injected into the reactor in order to control the reaction temperature. Preferably, the liquid acid droplets have a mean diameter in the range of 5–50 microns, typically 10–25 microns. For example, isobutane can be premixed with butylenes at the desired mole ratio and the gaseous mixture reacted in the presence of a fog of sulfuric acid droplets of about 10 microns in diameter at atmospheric pressure and 50° F. The product contains about 30–40% isobutane and the remainder is alkylate; whereas, the product from conventional liquid phase sulfuric acid alkylation contains 80–85% isobutane. Therefore, an advantage of the present process is a substantial savings in distillation costs.

BACKGROUND OF THE INVENTION

Paraffin-olefin alkylation, on a commercial scale, is done with reactants in the liquid phase. Reactants are usualy iso-butane and butylene (usually a "B-B" stream, e.g., containing about 35 volume percent butenes, the remainder mainly isobutane). The catalyst is liquid sulfuric acid or liquid hydrogen fluoride. The process is well known and has been successfully operating since the 1940's. In contrast, no successful commercial process has involved a fog phase acid catalyst, despite teachings of a gas phase alkylation using a hydrogen fluoride/fog catalyst.

The prior art (e.g. U.S. 2,378,439 to C. H. Schlesman, issued June 19, 1945 and U.S. 2,437,544 to M. M. Marisic, issued Mar. 9, 1948) has taught the alkylation of paraffins with olefins by contacting them with a fine spray or a fog of liquid phase hydrogen fluoride. Such art does not teach the alkylation of paraffins with olefins using a fog of concentrated sulfuric acid at about atmospheric pressure. However, U.S. 2,378,439 suggests using a hot sulfuric acid spray to polymerize isobutylene but does not teach that a sulfuric acid fog can catalyze paraffin-olefin alkylation. Nor does the prior art appreciate the importance of cocurrent flow of the catalyst fog and the hydrocarbon reactants (for example, U.S. 2,437,544 utilizes a countercurrent flow). Nor does the prior art appreciate the importance of dispersing such a liquid acid catalyst into droplets having a mean diameter in the range of 5–50 microns (preferably using electrostatic means of dispersing the liquid acid). Regarding the prior art, it should be noted that hydrogen fluoride is a stronger acid than sulfuric acid (e.g., U.S. 2,437,544 suggests use of a combination of HF and $H_2SO_4$ but not $H_2SO_4$ alone, presumably due to the stronger acidity of HF) and is far more volatile, having a much lower boiling point and higher vapor pressure than sulfuric acid. These characteristics have apparently led the art away from equating HF and $H_2SO_4$ in gas-fog phase alkylation.

SUMMARY OF THE INVENTION

A process for alkylation of gaseous $C_2$–$C_5$ monoolefin with gaseous $C_4$–$C_6$ branched paraffin comprises contacting the mixed gases at alkylation conditions with a fog or mist of strong mineral acid, preferably strong (e.g., 95–105%) sulfuric acid. Preferably, the catalyst and hydrocarbon reactants are maintained in a cocurrent flow. For $C_3$ or $C_4$ acyclic monoolefin and $C_4$ and $C_5$ isoparaffin, the preferred alkylation conditions include a temperature in the range of about 30–80° F. and a pressure about atmospheric (e.g., 5–25 p.s.i.a., typically 14–20 p.s.i.a.) The feed mole ratio, paraffin to olefin, can be in the range of 1:1 to 60:1, typically 2:1 to 30:1 Preferably, the liquid acid droplets have a mean diameter in the range of 5–50 microns, typically 10–25 microns.

For example, isobutane can be premixed with butylenes at the desired mole ratio and the gaseous mixture reacted in the presence of a fog of sulfuric acid droplets of about 10 microns in diameter at atmospheric pressure and 50° F. The product contains about 30–40% isobutane and the remainder is alkylate; whereas, the product from conventional liquid phase sulfuric acid alkylation contains 80–85% isobutane. Therefore, an advantage of the present process is a substantial savings in distillation costs.

The reacting gases, e.g., isobutane and butylene, can be pre-mixed and then reacted with a fog of sulfuric acid droplets. The droplets can be generated by electrostatic methods, for example, they can be generated by the means of producing a "charged aerosol" taught in the U.S. patents to A. M. Marks, U.S. 2,638,555, issued May 12, 1953 and U.S. 3,297,887, issued Jan. 10, 1967 or of A. M. Marks and E. Barreto, U.S. 3,191,077, issued June 22, 1965. The aerosol or fog need not necessarily be charged; therefore, for the present process an alternating current can be used instead of the direct current in these devices of these patents, thus, generating an uncharged aerosol. The charged aerosol is preferred; however, because the droplets can be directed to a discharge device (having an opposite charge to that of the droplets, thus, facilitating separation of the catalyst from the reaction mixture). Surprisingly, in the present gas-fog process, the necessary reactor volume has been found to be far less than would have been predicted by the thermodynamic calculations; that is, the dilution effect of the isobutane is greater than would be anticipated. An advantage of this gas-fog process is that the liquid product (e.g., alkylate-isobutane mixture) can contain only about 30–40% (by volume) isobutane (e.g., the equilibrium solubility mixture at 50° F. and 1 atm. pressure). The mixture is a conventional alkylation plant leaving the reactor is about 80–85% isobutane in alkylate due to the necessary higher pressure.

In a typical commercial $H_2SO_4$ alkylation plant, the minimum pressure in the reactor is about 25 p.s.i.a. and in the "front-end" of the system 40 p.s.i.a. is typical. In either process, feed isobutane in excess of that which can be dissolved in the product alkylate can be removed from the reactor, as a gas, and, if desired, recycled to the reactor. However, in the present process, excess gaseous isobutane can fill the reactor volume and act as a diluent; thus, permitting a lower paraffin/olefin ratio in the feed to the reactor and improving product quality. This means a corresponding decrease in utilities cost at the DIB tower. The cost savings in steam on a 10,000 B./D. alkylate plant are estimated as being at least $300,000/year.

Another feature of one embodiment of the present invention is the injection of liquid paraffin, preferably $C_4$–$C_6$ (e.g., n-butane, n-pentane and isobutane) into the reaction zone to control the temperature (e.g., remove the heat of reaction by vaporization of some or all of the liquid paraffin).

BRIEF DESCRIPTION OF THE DRAWINGS

In the accompanying drawings, FIG. 1 is a schematic representation of an embodiment of the process of the present invention, involving cocurrent contact of a gaseous mixture of isobutane and a so-called "B–B" feed comprising butane and butylenes. The numbers are related to the illustrative examples and indicate the flow rates of the catalyst, feed materials, product, etc., each in the equivalent of liquid barrels per hour.

FIG. 2 is a schematic illustration of a typical prior art liquid phase commercial sulfuric acid alkylation process capable of producing the same output of alkylate as the process embodiment of the present invention illustrated in FIG. 1. As is discussed, supra, in the illustrative examples, these drawings aid in comparing the advantages of the present process with that of the prior art.

FIGS. 3 and 4 are schematic illustrations of two types of reactor systems including electrostatic fog-producing means, which can be used in the process of the present invention (as, for example, in the process illustrated in FIG. 1).

FIG. 5 is a schematic illustration of apparatus referred to in the illustrative examples.

FURTHER DESCRIPTION OF THE INVENTION

I have discovered that an electrostatic fog-producing device can provide nearly perfect mixing between the fog of acid catalyst and a hydrocarbonaceous gas phase feed flowing cocurrently, thus, greatly improving the speed of the reaction and decreasing the necessary reactor volume needed to produce a given output of alkylate. The fog can be produced by passing a liquid through a hollow needle that is charged with about 2,000 to 8,000 volts D.C. The liquid on leaving the needle is dispersed into very small droplets. The size of the droplets depends on the voltage, but sizes of the order of 10 microns can be obtained (the limit of particle visibility in a strong light). Alkylation of butylenes with isobutane is a mass transfer limiting reaction; therefore, the electrostatic fogger is a useful means of conducting such an alkylation.

A gas-fog phase alkylation reactor, including an electrostatic fogging means can be used to produce gasoline boiling range alkylate from isobutane-isobutylene gas mixtures and sulfuric acid dispersed as a fine mist or fog. The acid is dispersed into a fog with a direct current high voltage charge. Acid fog can be continuously produced and the reactant gases flowed cocurrently with the fog. Mixture ratios of isobutane to isobutylene can be varied, for example, from 2:1 to 30:1. The temperature of reaction can typically be from 30° F. to 80° F. The pressure is preferably atmospheric, although higher or lower pressures can be used.

Alkylate quality (e.g., maximum percent $C_5$–$C_8$ and minimum percent $C_9+$) can be comparable to conventionally produced alkylate using the same reactant gases. Preferred reaction conditions comprise an isobutane/isobutylene ratio of about 10–20:1; temperature of about 30–35° F. and pressure of about 1 atmosphere. A conventional sulfuric acid alkylate using *isobutylene* will have about 35% $C_9+$; alkylate produced by the present process can contain about 30% $C_9+$.

Cost savings on the de-isobutanizer distillation column can be realized because of gas phase operation. The calculated savings are about 10¢ per barrel of alkylate. These savings are realized in decreased steam requirements on the DIB (i.e., de-isobutanizer) tower. This savings of about 10¢ per barrel is a significant decrease and indicates that the economics of the present process are at least as attractive as those of the more modern hydrofluoric acid plants. Another advantage is that the present process can utilize a much less expensive (although somewhat larger in volume) reactor vessel than is required in conventional liquid phase reaction. That is, since the present process can be run at atmospheric pressure, expensive pressure reactors and associated equipment are not required. Furthermore, the conventional alkylation requires expensive homogenization mixers to insure good liquid-liquid contacting. The present process can be run using a potentially less expensive mixing system (e.g., the electrostatic fog generator).

ILLUSTRATIVE EXAMPLES

Example I

A reactor system similar to that of FIG. 5 was set up, including an electrostatic fog generator. The reactor system comprised means (1, 2, 2a, 3) for feeding liquid acid to the electrostatic fog generation means (7, 8, 9, 9a, 10, 11, 12, 13), means (20, 21, 22, 23, 24, 25, 26, 27, 28, 29) for mixing and feeding olefin and paraffin to the reactor means (4, 5, 6), and means (14, 15, 16, 17, 18, 19) for venting unreacted gases and for collecting the alkylate product and the spent acid.

All parts were of Teflon and the walls of glass. The exciter ring 11 and discharge ring 13 of the fog generator were of 316 stainless steel. The inlet acid tube and needle 5 were of 316 stainless. The effective reactor volume (i.e., free space) was 100 cc. The acid reservoir 2 was a 500 cc. stainless Hoke bomb. All external tubing was stainless.

Sulfuric acid was reagent grade (98% min.); isobutylene was CP grade from Matheson Chemical Company. Isobutane was a technical grade Sun Oil Company refinery product (about 95% pure).

This reactor did not include means for cooling the reacting volume.

During operation of the reactor, liquid hydrocarbon product was qualitatively analyzed using a vapor phase chromatograph (VPC). The column had a simple boiling point separation packing. The product VPC scan could be compared with a scan of commercial alkylate and, thus, indicate whether product was similar. When product from the reactor was similar to the plant alkylate, a comprehensive analysis was made of the compounds in a sample of the product.

Before any reactant gases were admitted, the system was thoroughly purged with nitrogen. After about 30 minutes of purging with nitrogen, the acid flow was started at the desired rate. Reactant gases were started, the power supply was turned on and set at the desired level (about 4,000–6,000 volts) and below the level where arcing would occur. The system was allowed to operate for a few minutes to come to steady state operation. The atomization was observed to insure that the acid was atomized correctly. When correct atomization was achieved, the acid drops were so fine that they were invisible. When correct atomization was reached, the isobutane was turned on and set at the desired level, then the isobutylene was turned on at the desired level. In the gas liquid separator at the bottom of the reactor, unreacted gases were vented off and the liquid product was collected at the bottom.

During the runs, the acid layer was periodically drawn off through a stop cock at the bottom. When necessary, the organic layer could also be drawn off. A run usually lasted about 10–20 minutes. On approaching the end of the run period, the stop cock would be left open for a while to drain out all material. The organic material was immediately sampled and assayed on the VPC.

If the scan looked promising, the sample was retained for comprehensive analysis. If poor, the sample was discarded. In general, product volumes were of the order of .2 cc.

After closing the sample stop cock, voltage, reactant gases and acid were turned off. About 30 minutes would elapse between tests to allow the reactor to drain all liquids. In some runs, the acid would coat the glass walls of the reactor. When this occurred, the reactor was disassembled and cleaned in order that acid coating the walls would not alter the reaction conditions and, thus, not provide a reaction representative of gas-fog phase conditions. During the draining periods, nitrogen was used to purge the system. Then the run procedure was repeated with a new set of reaction conditions.

A total of 35 runs was made. These runs were designed to locate operating conditions for production of high quality alkylate. A high quality alkylate was defined as a material that had a VPC scan similar to a scan of the commercial alkylate. By this procedure, it was found that the mixture ratio of alkane to olefin was the main variable in determining the quality of the alkylate. This ratio for best results was about 10–20 moles isobutane to 1 mole isobutylene.

Other variables that affected quality, but to a much lesser degree, were acid rate, and temperature of incoming gases. In general, acid rates of .03–.3 cc./min. were used and quality was somewhat constant for these values. At the higher acid rates (0.3 cc./min.), the walls of the reactor would become coated with acid and most of the reaction would occur on the walls and quality would go down. When incoming gases were cooled to 32° F., an increase in quality was observed. This demonstrated the importance of cooling.

Voltage on the needle (the acid entrance) had no effect on quality except at higher voltages (4,000–5,000) where arcing could occur and temporarily change the atomization. Current was usually about 10–70 microamps. Table I summarizes the results of the runs of the present example.

Example II

A larger reactor was constructed, similar to that of Example I, except that the reactor had another tube inside the acid tube to permit controlled addition of liquid isobutane. As the butane vaporized, it extracted the heat of reaction, thus, controlling the reaction temperature. In this reactor, the temperature of reaction zone could be controlled with liquid isobutane. Using this cooled reactor, a series of 15 tests was run. Some of the tests were aborted beause of shorting from the needle to ground, but the product from the remaining tests was similar to product from commercial prior art sulfuric acid, liquid phase, alkylation using the same feedstocks. Table II summarizes the tests from this reactor. A comparison of product distribution in a product alkylate from this reactor with an alkylate from the literature (L. F. Albright, Chemical Engineering, Oct. 10, 1966, pp. 213–216) shows that the product of the present process can be at least equal in quality to the commercial alkylate. Yield based on isobutylene consumed was only about 50–70% of theoretical, but the usual engineering design improvements will permit theoretical yields.

In the accompanying drawings, FIG. 1 is a flow sheet of the embodiment of the present process and FIG. 2 illustrates conventional liquid phase $H_2SO_4$ alkylation. Table III shows a material balance of each such process. Table IV shows a heat balance around the DIB tower in each such process and shows the decreased heat load which is obtained with the process of the present invention. These calculations show that the gas-fog phase alkylation of the present invention can save about 11¢ per barrel of product due to decreased steam consumption to the DIB tower.

A small amount of "red oil" or "spent" acid (from conventional sulfuric acid alkylation or from a previous run of the present process) can be added to the $H_2SO_4$ catalyst to aid in "starting" the alkylation process (e.g., 10 parts used acid added to 300 parts (by volume) of fresh acid). Reactor pressures below atmospheric can be useful in vaporizing higher boiling feed components (e.g. $C_5$, $C_6$ branched paraffins) or the liquid paraffin coolant.

TABLE I.—SUMMARY OF RUNS IN EXAMPLE 1

| Run No. | Total gas flow (cc./min.) | Inlet gas temperature, °F. | Acid flow (cc./min.) | Moles $iC_4/C_4=$ | Percent $C_9+$ | Product VPC compared with standard |
|---|---|---|---|---|---|---|
| 1 | 2,157 | 60 | .04 | 9/1 | | Very poor product quality. |
| 2 | 1,625 | 60 | .04 | 12/1 | | Product formed on wall poor quality. |
| 3 | 1,575 | 60 | .04 | 20/1 | | No product formed. |
| 4 | 2,000 | 60 | .04 | 3/1 | | Quality poor, but yield of liquid high. |
| 5 | 3,600 | 60 | .04 | 8/1 | 80 | Quality poor. |
| 6 | 2,100 | 60 | .04 | 20/1 | 80 | Do. |
| 7 | 1,600 | 60 | .04 | 15/1 | 80 | Do. |
| 8 | 2,100 | 40 | .04 | 20/1 | 70 | Quality improved. |
| 9 | 2,100 | 40 | .04 | 20/1 | 70 | Do. |
| 10 | 3,100 | 40 | .05 | 30/1 | 67 | Do. |
| 11 | 3,100 | 40 | .06 | 20/1 | 87 | Quality poor. |
| 12 | 4,200 | 40 | .04 | 5/1 | 87 | Do. |
| 13 | 1,100 | 40 | .04 | 10/1 | 56.5 | Quality improved. |

NOTE.—Voltage 4,000–6,000 volts.

TABLE II.—SUMMARY OF RUNS IN EXAMPLE 2
[Liquid isobutane injection for cooling]

| No. | Total flow gaseous mix (cc./min.) | Gas equivalent of injected liquid $iC_4$ | Total moles $iC_4/iC_4=$ | Acid flow (cc./min.) | Percent $C_9+$ | Product quality |
|---|---|---|---|---|---|---|
| 14 | [1] 100 | 2,000 | 20/1 | .25 | | Very poor quality. Electrical shorting occurring. |
| 15 | [1] 200 | 1,600 | 8/1 | .25 | +85 | Poor quality. |
| 16 | 2,200 | 2,000 | 20/1 | .10 | 28.1 | Excellent quality. |
| 17 | 2,200 | 2,000 | 20/1 | .10 | 40.4 | Good quality. |
| 18 | 3,400 | 800 | 20/1 | .28 | 63 | Do. |
| 19 | 3,400 | 800 | 20/1 | .50 | 62 | Do. |
| 20 | 3,400 | 800 | 20/1 | .28 | 75 | Poor quality. |
| 21 | 3,160 | 400 | 17/1 | .30 | 56 | Good quality. |
| 22 | 3,000 | 800 | 18/1 | .30 | 58.4 | Do. |
| 23 | 1,700 | 400 | 20/1 | .15 | 56.4 | Do. |
| 24 | 1,700 | 400 | 20/1 | .25 | 71.3 | Poor quality. |
| 25 | 1,700 | 400 | 20/1 | .075 | 38.7 | Good quality. |
| 26 | 1,600 | 1,500 | 30/1 | .19 | 18.3 | Excellent quality. |
| 27 | 2,700 | 1,500 | 20/1 | .20 | 21.6 | Do. |
| 28 | 3,000 | 1,500 | 8/1 | .15 | 28 | Do. |
| 29 | 2,700 | 1,500 | 20/1 | .50 | 76.9 | Poor quality. |
| 30 | 3,000 | 1,000 | 7/1 | .26 | +80 | Do. |

[1] 100% isobutylene.

TABLE III.—GAS PHASE SULFURIC ACID ALKYLATION PROCESS MATERIAL BALANCE

| Component | Stream, all flowrates in bbl./hr. | | | | | | | | | | | | K 50° F. 1 atm. | Lb./B. | Lb. mol/B. |
|---|---|---|---|---|---|---|---|---|---|---|---|---|---|---|---|
| | 1 B-B feed | 2 Iso-butane | 3 Liquid recycle | 4 | [1]5 Reactor vapor | [2]6 Effluents liquid | [3]7 DIB feed | 8 Isobutane recycle | 9 n-Butane | [4]10 Alkylate | [5]11 Acid make-up | [5]12 Acid spent | | | |
| i-C₄ | 142 | 110 | 1,319 | | 1,152 | 167. | 167. | 167 | | | | | 2.2 | 196.8 | 3.39 |
| C₄= | 223 | | | | | | | | | | | | 1.9 | 209.8 | 3.75 |
| n-C₄ | 60 | | 326 | | 316 | 70. | 70. | 10 | 30.8 | 29.2 | | | 1.45 | 204.3 | 3.52 |
| C₅ | 4 | | | | | 43.1 | 43.1 | | | 43.1 | | | 0.48 | 219 | 3.04 |
| C₆ | | | 65.5 | | 65.5 | 27.8 | 27.8 | | | 27.8 | | | 0.18 | 231.4 | 2.68 |
| C₇ | | | 15.9 | | 15.9 | 20.9 | 20.9 | | | 20.9 | | | 0.15 | 241.5 | 2.41 |
| C₈ | | | 3.3 | | 3.3 | 250.0 | 250.0 | | | 250.0 | | | 0.015 | 250 | 2.19 |
| C₉+ | | | 12.3 | | 12.3 | 46.7 | 45.5 | | | 45.5 | | | 0.0014 | 275 | 2 |
| Acid | | | | | | | | | | | 20 | [6]0.8 20.0 | | | |
| Total B/H | 429 | 110 | 1,742. | | 1,565. | 625.1 | 624.3 | 177 | 30.8 | 416.5 | 20 | 20.8 | | | |
| B/SD | | | | | | | | | | 10,000 | | | | | |
| Lbs./hr | 87,838 | 21,648 | | | | | | 34,909 | 6,292 | 101,898 | | | | | |
| | Conventional sulfuric acid alkylation, design basis | | | | | | | | | | | | | | |
| C₃ and Ltr | 6.5 | 11.7 | | | 301 | 103. | | 103. | [7]18.2 | | | | | | |
| i-C₄ | 142 | 114. | | | 1,094 | 1,076.7 | | 1,704. | 2.7 | | | | | | |
| C₄= | 223 | | | | | | | | | | | | | | |
| n-C₄ | 60 | 43.5 | | | 165 | 452.4 | | 350. | 85 | 17.4 | | | | | |
| C₅ | 4 | .5 | | | 4 | 25.0 | | 0.5 | 1.3 | 23.2 | | | | | |
| C₆ | | | | | | 15.7 | | | | 15.7 | | | | | |
| C₇ | | | | | | 16.7 | | | | 16.7 | | | | | |
| C₈ | | | | | 1 | 306.9 | | | 0.7 | 306.2 | | | | | |
| C₉ | | | | | | 38.1 | | | | 37.3 | | | | | |
| Acid | | | | | | | | | | | 20 | [6]0.8 20 | | | |
| Total B/H | 435.5 | 169.7 | | | 1,565 | 2,664.5 | | 2,157.5 | 107.9 | 416.5 | 20 | 20.8 | | | |
| B/SD | | | | | | | | | | 10,000 | | | | | |
| Lbs./hr | 89,725 | 33,495 | | | | | | 427,570 | 21,265 | 101,730 | | | | | |

[1] In equilibrium with streams 6, 7.
[2] Excluding acid.
[3] Saturated liquid, 1 atm., 50° F.
[4] Typical alkylation plant product.
[5] Net quantities only.
[6] Assume 225#/hr. loss as acid sludge.
[7] Sum=Butane plus propane purges.

TABLE IV.—HEAT BALANCE, DIB TOWER

| Outputs or heat use— | Current design | | | Proposed design | | | C B.t.u./Lb., °F. |
|---|---|---|---|---|---|---|---|
| | MLB./hrs. | Temperature range, °F. | Heat duty, MM.B.t.u./hr. | MLB./hrs. | Temperature range, °F. | Heat duty, MM.B.t.u./hr. | |
| Sensible heat: | | | | | | | |
| Alkylate | 101.7 | 50–180 | 6.6 | 101.9 | 50–180 | 6.6 | 0.5 |
| Butane | 18.5 | 50–100 | 0.52 | 6.3 | 50–100 | 0.18 | 0.56 |
| Isobutane | 427.5 | 50–65 | 3.65 | 34.9 | 50–65 | 0.3 | 0.57 |
| Total | 547.7 | | (10.77) | 143.1 | | (7.08) | |
| Latent heat: | | | | | | | |
| Butane | | | 3.1 | | | 1.06 | |
| Isobutane | | | 58.5 | | | 4.65 | |
| Total | | | (61.6) | | | (5.71) | |
| Total | | | 72.37 | | | 15.8 | |
| Inputs: | | | | | | | |
| Steam (40 p.s.i.g.) | 55.5 | | 52.1 | | | | |
| Do | | | 15.9 | | | | |
| Total | | | 68.0 | | | | |

The invention claimed is:

1. Process for alkylation of $C_2$–$C_5$ acyclic monoolefin with $C_4$–$C_6$ branched paraffin, said process comprising contacting in a reactor vessel, said monoolefin and said paraffin in the presence of a fog consisting essentially of strong sulfuric acid under alkylation conditions.

2. Process of claim 1 wherein said sulfuric acid, paraffin and monoolefin are maintained in cocurrent flow until the alkylation reaction is completed.

3. Process of claim 1 wherein said alkylation conditions include a temperature in the range of 30–80° F., a pressure in the range of 5–25 p.s.i.a., and a feed molar ratio of paraffin to olefin in the range of 2:1 to 30:1.

4. Process according to claim 1 wherein said fog consists essentially of sulfuric acid droplets having a mean diameter in the range of 5–50 microns.

5. Process according to claim 3 wherein said monoolefin consists essentially of $C_3$ or $C_4$ monoolefin, or a mixture thereof, and said paraffin consists essentially of $C_4$ or $C_5$ branched paraffin, or a mixture thereof.

6. Process according to claim 3 wherein said monoolefin comprises butene-1, butene-2, or isobutene, or a mixture thereof and said paraffin comprises isobutane.

7. Process according to claim 1 wherein said pressure is in the range of 14–20 p.s.i.a.

8. Process according to claim 1 wherein a paraffin hydrocarbon in liquid phase is injected into said reactor vessel to control the temperature of the reaction.

9. Process according to claim 1 wherein said paraffin consists of isobutane.

10. Process according to claim 1 wherein said fog is generated by electrostatic means.

11. Process according to claim 1 wherein said fog consists of a charged aerosol and wherein said reactor contains collector means including means for discharging the charge after alkylation has occurred.

References Cited
UNITED STATES PATENTS

| | | | |
|---|---|---|---|
| 2,378,439 | 6/1945 | Schlesman | 260—683.52 |
| 2,437,544 | 3/1948 | Marisic | 260—683.52 |
| 2,751,425 | 6/1956 | Rupp | 260—683.59 |
| 3,053,917 | 9/1962 | Bergougnou | 260—683.59 |
| 3,082,274 | 3/1963 | Mayer | 260—683.59 |
| 3,109,042 | 10/1963 | Mayer | 260—683.59 |

DELBERT E. GANTZ, Primary Examiner
G. J. CRASANAKIS, Assistant Examiner

U.S. Cl. X.R.

204—165